United States Patent
Ding

(10) Patent No.: US 9,204,502 B1
(45) Date of Patent: Dec. 1, 2015

(54) LIGHT STRING

(71) Applicant: Yunmeng Yun Xi Lighting Products CO., LTD., Xiaogan (CN)

(72) Inventor: Feng Ding, Xiaogan (CN)

(73) Assignee: YUNMENG YUN XI LIGHTING PRODUCTS CO., LTD., Xiaogan (CN)

( * ) Notice: Subject to any disclaimer, the term of this patent is extended or adjusted under 35 U.S.C. 154(b) by 0 days.

(21) Appl. No.: 14/574,629

(22) Filed: Dec. 18, 2014

(30) Foreign Application Priority Data

Nov. 14, 2014 (CN) .................... 2014 2 0680609 U

(51) Int. Cl.
  *H05B 37/00* (2006.01)
  *H05B 33/08* (2006.01)
  *H05B 37/02* (2006.01)

(52) U.S. Cl.
  CPC ............ *H05B 33/0803* (2013.01); *H05B 37/02* (2013.01)

(58) Field of Classification Search
  USPC ........................... 315/185 R, 186, 185 S, 291
  See application file for complete search history.

(56) References Cited

U.S. PATENT DOCUMENTS

| | | | | |
|---|---|---|---|---|
| 8,698,415 B2* | 4/2014 | Tobler | ............... | H05B 33/0803 315/291 |
| 8,884,548 B2* | 11/2014 | Martin-Lopez | ........ | H05B 37/02 315/291 |
| 2010/0213853 A1* | 8/2010 | Tobler | ............... | H05B 33/0803 315/113 |
| 2010/0277092 A1* | 11/2010 | Menegazzi | ......... | H05B 33/0812 315/291 |
| 2012/0249000 A1* | 10/2012 | Kawai | ............... | H05B 33/0851 315/200 R |
| 2015/0137688 A1* | 5/2015 | Gibbs | ............... | H05B 33/0815 315/186 |

* cited by examiner

*Primary Examiner* — Thuy Vinh Tran
(74) *Attorney, Agent, or Firm* — Hemisphere Law, PLLC

(57) ABSTRACT

The present invention provides a light string including at least one light series branch which includes a plurality of lights connected in series one another and at least a protecting circuit each connected between a corresponding one of the at least one light series branch and the AC power supply. Each protecting circuit includes a diode bridge rectifier, a line switch connected with the light series branch in series, a sample circuit and a control circuit for opening the line switch when a sample voltage is larger than or equal to a preset voltage. The control circuit has an output terminal that can obtain power from the diode bridge rectifier and control an on-off state of the line switch according to the sample voltage. The structure of the light string is more simply than the existing light string and its power consume and heat is reduced.

7 Claims, 4 Drawing Sheets

LIGHT STRING

BACKGROUND OF THE INVENTION

1. Field of the Invention

The invention relates to light strings.

2. Description of Related Art

Light strings are widely used for decorative purposes, especially for holiday lighting.

Light strings refer to incandescent filament lamps or LED lamps connected electrically in a series. Generally, a light string includes more than 10 incandescent filament lamps, and is powered by mains electricity, such as 110V AC mains electricity. Each of the light connected in the light string typically includes a lamp, a socket for receiving the lamp, and a holder for receiving the socket and two metal conductive pieces which are electrically connected to the lamp. The two metal conductive pieces are electrically connected to the metal conductive pieces of adjacent lights via electrical wires.

In the conventional light strings, when the lamp fails and the lamp remains in the socket, or when the lamp is removed from its socket for replacement, the closed path for the flow of electrical current is interrupted and the remainder of the lamps in the string will no longer be illuminated. To prevent the occurrence of this condition, a "smart light" is invented. In the smart light, a protruded end made of insulating material is protruded from a lower end of the socket, and the two metal conductive pieces are formed to have elastic structures. When the socket with a lamp is inserted in the holder, the protruded end is inserted between the two metal conductive pieces, thus the two metal conductive pieces are electrically isolated. When the socket with the lamp is removed from the holder, the two metal conductive pieces are electrically connected depending on the elastic structures, thus the remainder lamps can still illuminate.

When the lamp is an incandescent filament lamp, to prevent fails of the light string because of one or more lamps are burned out, the lamps of the smart light use bulbs with a fuse. The fuse will short the two pins of the bulb once the filament of the lamp is burned out thus the remainder lamp can still illuminate. For smart LED lamp, when one or more lamps are not illuminated because of over current, the failed lamp(s) is(are) substantially short circuit, thus the remainder lamp can still illuminate. However, the total resistance of the light string becomes lowered when any lamp is burned out or is removed from the holder, and a current of the light string become larger. When the number of the burned lamps and removed lamps reaches to a certain number, the power of the light string will exceeds the rated power of the reminder lamps, this may cause burned out of all the reminder lamps, even fire.

To prevent this situation, a resistor or a diode or a combination of a resistor and a diode whose resistance is close to that of the lamp is utilized to be connected parallel to each lamp in an existing smart light, thus the fuse in the incandescent filament lamp is omitted. When the lamp is burned out or is removed, the resistor or the diode or the combination of the two is connected in series in the circuit, thus the reminder lamps can still illuminate, and a total resistance of the light string will not lowered, over current will not occur. However, this structure of the light string uses a lot of resistors/diodes, and causes big power loss, large heat release, and high cost. Therefore, an improved light string is needed.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings.

Figure 1:
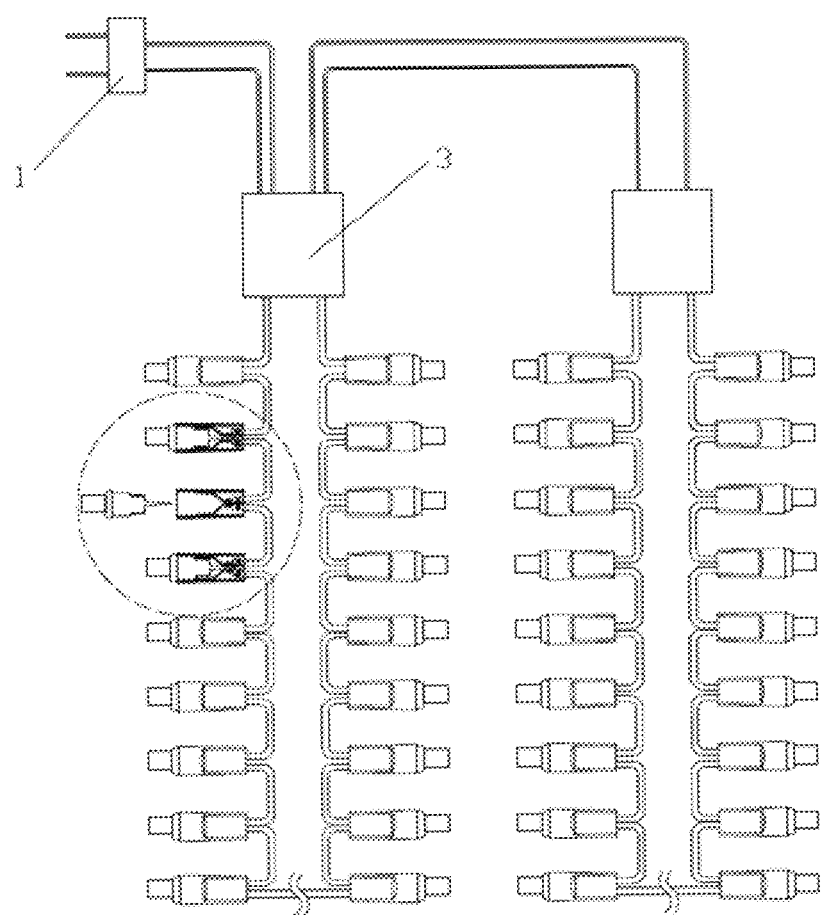
FIG. 1 is a perspective view of a light string in accordance with an embodiment of the invention.
Figure 2:
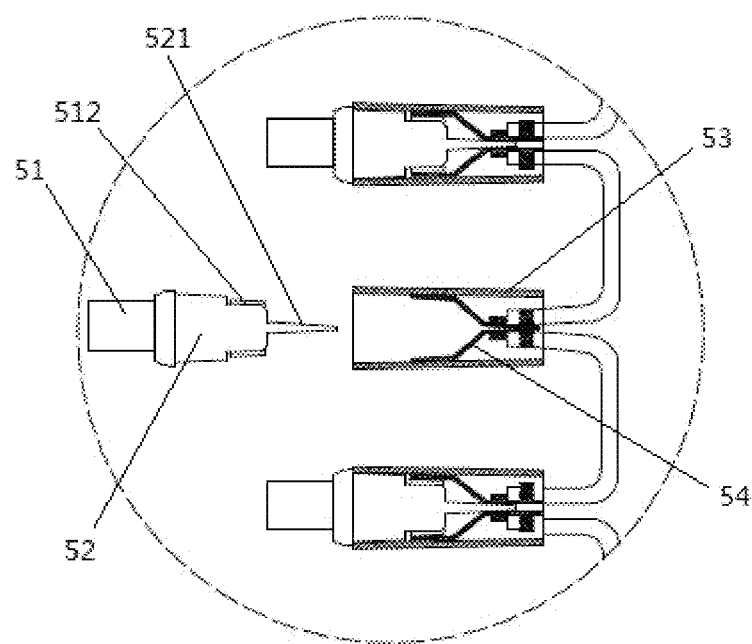
FIG. 2 is a partial enlarged view of the light string of FIG. 1.

FIG. 1 illustrates a light string of an embodiment of the present invention. The light string includes a power plug 1, two protecting circuit 3 and two light series branches. Each of the two protecting circuit 3 is connected in series with one of the two light series branches to for a series circuit, and the two series circuit are electrically connected in parallel at an output terminal of the power plug 1. In detail, the protecting circuit 3 is connected between the light series branch and the power plug 1. Each light series branch includes ten to thirty lights connected in series. It is understandably that the number of the light series branches and their protecting circuit 3 is not limited to two, there can be three or more light series branches each configured a protecting circuit. The protecting circuit 3 is mainly used for electrically isolating the corresponding light series branch and the power plug 1 when the current flowing in the corresponding light series branch is equaled to or higher than a preset current, as a result, the reminder lamps in the corresponding light series branch are protected.

It is understandably, there can be only one series circuit composed of one protecting circuit 3 and a light series branch, or more than two series circuits each composed of one protecting circuit 3 and one light series branch. Herein after, one of the series circuit is described. The protecting circuit 3 is located on a printed circuit board which is sealed in an insulating housing. A positive input terminal and a negative input terminal are configured at an end of the printed circuit board, and a positive output terminal and a negative output terminal are configured at the other end of the printed circuit board. The two electrical wires extending from the output terminal of the power plug 1 are electrically connected with the positive input terminal and the negative input terminal of the protecting circuit 3, respectively. The positive input terminal and the negative input terminal of the protecting circuit 3 are also respectively electrically connected to the positive input terminal(s) and the negative input terminal(s) of the other protecting circuit(s) to realize parallel connection of the light series branches. The positive output terminal and the negative output terminal of the protecting circuit 3 are connected to two terminals of the light series branch. In detail, wire holes are defined in the side wall of the insulating housing, wires from the power plug 1 or connected to the other protecting circuit, and wires connected with the light series branch pass through the wire holes, and are connected with corresponding terminals on the printed circuit board.

The structure of the light in the light series branch is such designed that the light series branch will not break (open) when one or more lamps are removed from the holders of the lights or the lamps are burned out, and a voltage drop on every remainder light becomes larger than before. In particularly, lights of the light series branch utilizes LED lamp. In an exemplary embodiment, each light in the light series branch includes a lamp 51, a socket 52 for receiving a lower part of the lamp 51, and a holder 53 for receiving the socket 52. At least two lamp pins extend downwardly from the lamp 51. The socket 52 includes a receiving part for receiving a lower part of the lamp, a guiding block extended from the bottom end of the receiving part, and a plug-in piece extending from the bottom end of the guiding block. Side wall or bottom board of the receiving part of the socket 52 defines two or more wire holes. The lamp pins of the lamp 51 pass through the wire holes on the socket 52, and is folded up to attach the outside surface of the socket 52. The holder 52 is hollow, and receives two conductive pieces which are separated apart with each other and are respectively connected to terminals of wires connecting adjacent lights or the protecting circuit 3. The socket 52 with the lamp mounted therein is detachably received in the holder 53, and the lamp pins are electrically attached to corresponding conductive pieces with the plug-in piece located between the two conductive pieces. In detail, each conductive piece includes a first conductive part and a second conductive part connected with the first conductive part. When the socket is inserted in the holder, the first conductive parts are respectively electrically connected with the lamp pins and are electrically isolated by the receiving part and the guiding block, and the second conductive parts are electrically isolated by the guiding block and the plug-in piece. When the socket is removed from the holder, at least the second conductive parts are electrically attached depending on elastic structures.

Figure 3:
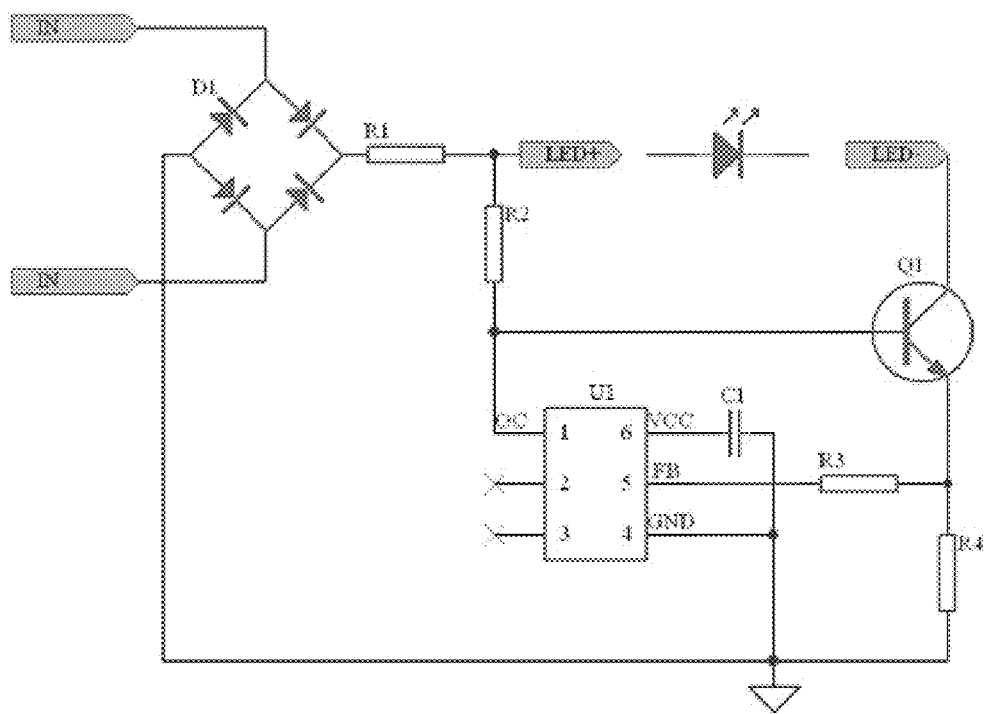
FIG. 3 is a circuit diagram of the light string in accordance with an embodiment of the invention.

FIG. 3 illustrates a circuit diagram of the light string according to an embodiment of the present invention. As shown in the figure, the protecting circuit 3 includes a diode bridge rectifier D1, a first resistor R1, a second resistor R2, a line switch Q1, a sample circuit consisted of a third resistor R3 and a fourth resistor R4, and a control circuit consisted of a control chip U1 and a DC capacitor C1.

The diode bridge rectifier D1 is used for converting the AC current from the power plug 1 into DC current. The positive output of the diode bridge rectifier D1 is connected to an end of the light series branch via the first resistor R1, and the negative output of the diode bridge rectifier D1 is grounded.

In the embodiment, the line switch Q1 is an NPN type transistor, its base acting as a control terminal is connected with the control chip U1, its collector is connected with the other end of the light series branch, and its emitter is connected with the negative output of the diode bridge rectifier D1 via the fourth resistor R4. The base of the line switch Q1 is also connected to a connection point of the first resistor R1 and the light series branch via the second resistor R2, and is powered by the diode bridge rectifier D1.

The sample circuit is used for sampling a line current flowing in the light series branch and generating a sample voltage corresponding to the sampled line current. An end of the third resistor R3 is connected to a higher voltage end of the fourth resistor R4, and the other end of the third resistor R3 acts as the output terminal of the sample circuit and is connected to the control chip U1.

The control chip U1 has a sample pin FB, a ground pin GND, a power supply pin VCC, and an output pin OC. At the outside of the control chip U1, the sample pin FB is connected to the other end of the third resistor R3, the ground pin GND is grounded, the power supply pin VCC is connected to the ground pin GND via the DC capacitor C1.

Figure 4:
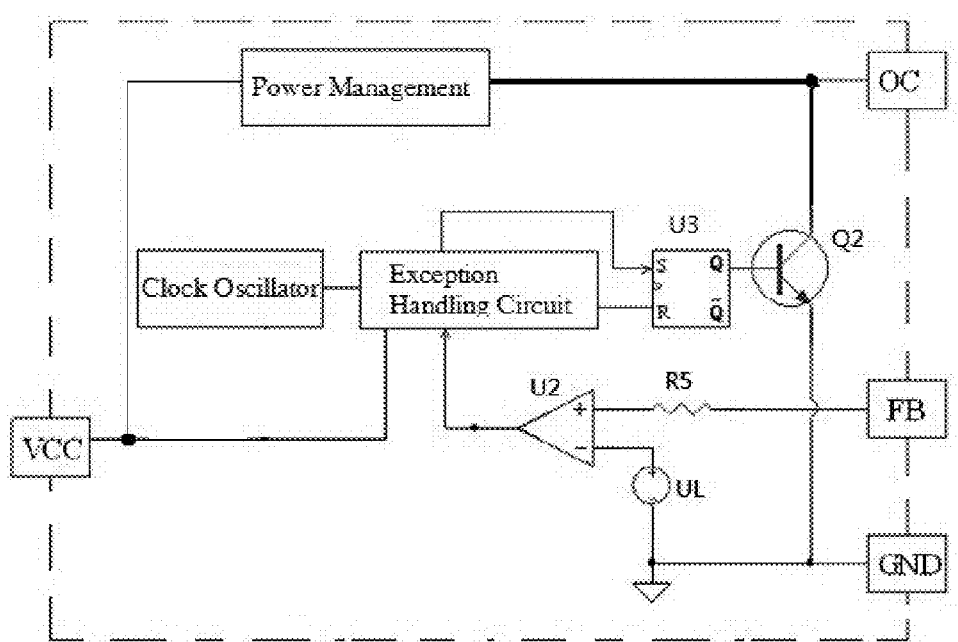
FIG. 4 is a circuit diagram of the control chip of the FIG. 3.

FIG. 4 illustrates an inner circuit of the control chip U1. The inner circuit integrates a clock oscillator circuit, a power management circuit, an exception handling circuit, a reference voltage source UL, a comparator amplifier U2, a trigger U3, and a first switch transistor Q2.

The clock oscillator circuit is used for providing clock signal for the other circuit in the control chip U1. Although only the excepting handling circuit is connected with the clock oscillator circuit in FIG. 4, it is understandably that the clock oscillator circuit also supplies clock signal for other circuits those need the clock signal.

The power management circuit is connected with the output pin OC, and is powered by the diode bridge rectifier D1 through the output pin OC. The power management circuit then supplies power for the other circuit in the control chip U1, for example but not limited to the comparator amplifier U2, the trigger U3, the clock oscillator circuit, and the power supply pin VCC, that is, the control chip U1 is self-powered.

The reference voltage source UL is used for supplying a reference voltage. The positive input of the comparator amplifier U2 is connected with the sample pin FB, the inverse input of the comparator amplifier U2 is connected with the output of the reference voltage source UL, and the output of the comparator amplifier U2 is connected with the exception handling circuit. The exception handling circuit is connected with the control terminal of the first switch transistor Q2 via the trigger U3. The first terminal of the first switch transistor Q2 is connected with the output pin OC, and the second terminal of the first switch transistor Q2 is grounded. As thus, when the sample voltage at the sample pin FB is larger than or equal to the reference voltage, the first switch transistor Q2 is conducted to ground the output pin OC, and the line switch Q1 is cut off to break the power supply of the light series branch. Preferably, the first switch transistor Q2 is a NPN type transistor, the first terminal is its collector, the second terminal is its emitter, and the control terminal is its base.

In operation, when the power plug 1 is inserted in the socket connecting in the mains supply, the diode bridge rectifier D1 converts the AC current from the mains supply into DC current. The DC current is flowing to the line switch Q1 through the first and second resistors R1, R2 to turn on the line switch Q1, the light series branch is powered and illuminates. The DC current flows through the fourth resistor R4, and a voltage drop crossed the fourth resistor R4 is generated. The control chip U1 samples the voltage drop on the fourth resistor R4 through the third resistor R3 to obtain the sample voltage. The comparator amplifier U2 compares the sample voltage and the reference voltage. When the sample voltage is lower than the reference voltage, the output of the comparator amplifier U2 does not change, the first switch transistor Q2 is maintained cut off, the light series branch works normally. When the sample voltage is higher than or equal to the reference voltage, the output of the comparator amplifier U2 becomes inverse, in response, the exception handling circuit outputs two trigger signals in different time series to the R terminal and S terminal of the trigger U3. As a result, the output voltage of the trigger U3 is locked and maintains a high voltage (larger than or equal to 0.7V), the first switch transistor Q2 is turned on and conducted, the output pin OC is grounded, the line switch Q1 is cut off, and the light series branch is powered off. It is understandably, by configuring the parameters of the fourth resistor R4, the third resistor R3, and the reference voltage, the output of the trigger can be locked to high voltage to turn on the first switch transistor Q2 and cut off the line switch Q1 to protect the remainder lights in the light series branch when a number of the failed lamps and removed lamps reaches to a preset number.

In the embodiment, the trigger U3 is an RS trigger. It is also understandably, other types of triggers can be utilized when the control chip has other functions, such as lightning protecting function, etc. When the voltage type of the output of the comparator amplifier changes, corresponding type of the first switch transistor, such as metal-oxide-semiconductor field effect transistor, could be utilized.

To sum up, the light string of the present invention has a protecting circuit with a reference voltage source, thus accurate control of the switch is achieved. When the number of the failed lamps and removed lamps reaches to a preset number, which lead to a line current of the light series branch becomes larger than or equal to a preset value, the line switch is opened to protecting the reminder light from been burned out. After the user replaces the burned lamps with normal lamps, and inserts normal lamps in the empty sockets, the light string can illuminate again. The protecting circuit only includes a diode rectifier circuit, a switch, two sample resistors, a DC capacitor, and a micro-chip, the resistors and the capacitors connected parallel to all the lights are omitted, thus the structure of the light string is more simple, thus low cost, low energy loss can be achieved. There is no component, such as electrolytic capacitor, whose lifetime is shorter than a LED light in the protecting circuit, thus is suitable for LED light string.

In the exemplary embodiment, the control circuit in the protecting circuit is in the form of a chip, it is understandably, in the other embodiment, the control circuit could be an analog circuit. The line switch can also use other switching transistor, such as metal-oxide-semiconductor field effect transistor.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A light string, comprising:
   a plurality of lights connected in series to form a light series branch; and
   a protecting circuit connected between the light series branch and an AC power supply, the protecting circuit comprising:
   a diode bridge rectifier configured for converting an AC current from the AC power supply to a DC current, a positive output of the diode bridge rectifier connecting with an end of the light series branch via a first resistor, and a negative output of the diode bridge rectifier being grounded;
   a line switch connected in series with the light series branch, with a control terminal connected with a connection point between the first resistor and the light series branch via a second resistor;
   a sample circuit comprising a third resistor and a fourth resistor connected with the third resistor, configured for sampling a line current flowing in the light series branch and outputting a sample voltage, the fourth resistor connecting in series with the light series branch, a terminal of the third resistor being connected with a higher voltage terminal of the fourth resistor, the other terminal of the third resistor acting as an output terminal of the sample circuit, and the other end of a series circuit composed of the light series branch, the line switch and the fourth resistor being grounded; and
   a control circuit configured for switching off the line switch when the sample voltage is larger than or equal to a preset voltage, and comprising an output terminal for receiving power from the diode bridge rectifier via the first resistor and the second resistor and realizing an on-off control of the line switch;
   wherein each light is such configured that when a lamp of the light is removed from the light or the lamp is burned out, the remainder lamps in the light string can still illuminate, and a voltage drop across each remainder lamp become higher than before.

2. The light string of claim 1, wherein the line switch is an NPN type transistor, a base of the NPN type transistor acts as the control terminal, a collector of the NPN type transistor is connected with the light series branch, and an emitter of the NPN type transistor is grounded via the fourth resistor.

3. The light string of claim 1, wherein the control circuit comprises:
   an exception handling circuit;
   a reference voltage source configured for supplying a reference voltage;
   a comparator amplifier with an input connected with the output terminal of the sample circuit, the other input connected with the reference voltage source, and an output connected with the exception handling circuit; and
   a first switch transistor with a first terminal connected with the control terminal of the line switch, a second terminal grounded, and a control terminal connected with the exception handling circuit via a trigger.

4. The light string of claim 3, wherein the first switch transistor is an NPN type transistor with its collector acting as the first terminal, an emitter acting as the second terminal, and a base acting as the control terminal.

5. The light string of claim 3, wherein each light of at least a part of the plurality of lights comprises:
   a lamp with at least two lamp pins extending downwardly therefrom;
   a socket defining at least two wire holes configured for permitting the at least two lamp pins to extend outside the socket, the socket comprising:
   a receiving part configured for detachably receiving a lower part of the lamp;
   a guiding block connected at a bottom end of the receiving part; and
   a plug-in piece extending downwardly from a bottom end of the guiding block; and
   a holder configured for detachably receiving the socket and at least two separated configured conductive pieces wherein each conductive piece comprising:
   a first conductive part configured for electrically attached with a corresponding one of the at least two lamp pins; and
   a second conductive part connected with the first conductive part and a electrical wire which is used for connecting the light with an adjacent light;
   wherein when the socket is inserted in the holder, the first conductive parts are respectively electrically connected with the at least two lamp pins and are electrically isolated by the receiving part and the guiding block, and the second conductive parts are electrically isolated by the guiding block and the plug-in piece; when the socket is removed from the holder, at least the second conductive parts are electrically attached.

6. The light string of claim 5, wherein the lamp is an LED lamp.

7. The light string of claim 5, further comprising one or more light series branches and one or more protecting circuits, wherein each light series branch is connected with a protecting circuit, and each protecting circuit is connected between the AC power supply and a corresponding one of the light series branches.

* * * * *